Patented Nov. 22, 1949

2,488,722

UNITED STATES PATENT OFFICE 2,488,722

CATALYTIC HYDROGENATION OF CELLULOSE TO PRODUCE OXYGENATED COMPOUNDS

Hamit H. Gürkan, Ankara, Turkey

No Drawing. Application November 14, 1946, Serial No. 709,771

8 Claims. (Cl. 260—594)

The present invention relates to a method of producing alcohols, glycols and hydroxyketones from cellulose and more particularly to the conversion of cellulose into various liquid organic products, including alcohols, glycols and hydroxyketones, by means of catalytic hydrogenolysis and hydrogenation of cellulose.

Cellulose has been used for a long period of time in the making of paper, but has been utilized to a very limited extent to the making of chemical products therefrom. It has long been known that concentrated sulphuric acid dissolves cellulose, for example, and that if the solution be diluted with water and boiled, dextrin and ultimately dextrose are produced. It has been recognized also that dextrose may be converted into alcohol, thus serving as an indirect method of producing alcohol from cellulose, although this method has never been made use of commercially.

It has also been long known that while cellulose is insoluble in all ordinary solvents, it may be dissolved in an ammoniacal solution of cupric oxide (CuO), known as Schweizer's reagent, and that by means of acids, cellulose may be reprecipitated from this solution in the form of a jelly, which when washed with water and dried forms a grayish cellulose powder.

Attempts have been made to hydrogenate cellulose, but without successful results. Thermal distillation of cellulose has also been attempted at atmospheric pressure, but no useful products were obtained, about 71% of the carbon originally present in the cellulose being converted to solid char, the remainder being formed into complex organic materials. About 13% of the carbon originally present formed complex aliphatic and aromatic compounds including furan and pyran derivatives. A considerable percentage of the cellulose was converted into water, indicating that much of the hydrogen and oxygen present was not utilized in forming desirable chemicals. The distillation of cellulose has also been attempted at super-atmospheric pressure, specifically under 200 atmospheres of nitrogen at a temperature of about 268° C. in the presence of nickel acetate as a catalyst, by which conversion of 80% of the cellulose into volatile products occurred, but the volatile products were mainly water with minor amounts of organic compounds similar to those obtained by the dry pyrolysis of cellulose at atmospheric pressure.

None of the methods for the treatment of cellulose heretofore known are commercially applicable for the production of useful liquid organic products, and the present invention is particularly designed to provide a method by which valuable products, as alcohols, glycols and ketones, or hydroxyketones, may be obtained with commercially satisfactory yields.

The present invention is based on the discovery that cellulose may be converted by hydrogenolysis under super-atmospheric pressure and in the presence of a catalyzer to form various useful products with relatively high yields, by which alcohols, glycols and hydroxyketones may be produced on a commercial scale from cellulose. It was discovered that by the use of Schweizer's reagent, by which the cellulose is dissolved, the copper compound in the reagent may be reduced by means of hydrogen under pressure at a temperature above 150° C., by which a precipitate of cellulose containing metallic copper in a fine state of homogeneous dispersion is formed. The co-precipitate of cellulose and copper may be treated by hydrogenolysis above 250° C., by which the cellulose is completely converted into liquid and gaseous products, including alcohols, as isopropyl alcohol, glycols, as propylene glycol, and hydroxyketones, as acetol (1-hydroxy-2-propanone), without the formation of any char or tar. The hydrogenolysis is preferably carried out by suspending the co-precipitate of cellulose and copper in an aqueous methyl alcohol solution at a temperature of about 250° C. By the use of aqueous methyl alcohol (methanol) as a suspension medium, the transformation of acetol into a higher polymer is avoided, and propylene glycol and isopropyl alcohol are formed in substantial yields.

In making the Schweizer's reagent for the solution of the cellulose, clean copper turnings are preferably held in a column, such as a glass column, and 28% aqueous ammonia is introduced at the top of the column so as to flow downwardly by gravity through the copper turnings, while oxygen, saturated with gaseous ammonia is led in at the bottom of the column. The Schweizer's solution may be collected at the bottom of the column and recirculated with additions of fresh aqueous ammonia until the copper content of the solution reaches about 44 grams per liter. The preparation of Schweizer's reagent is preferably carried on at temperatures between 0.0° C. to 5.0° C., in order to avoid the formation of ammonium nitrite.

One of the objects of the invention is to provide a method for the conversion of cellulose into liquid organic products containing relatively high yields of alcohols, glycols and hydroxyketones.

Another object of the invention is to provide a method for the conversion of cellulose into liquid organic products by the use of a catalyst which may be distributed in finely divided form throughout the body of the cellulose to be converted, whereby substantially complete conversion of the cellulose into liquid and gaseous products may be obtained.

Another object of the invention is to provide a method for the catalytic conversion of cellulose which may be controlled so as to vary the composition of the final products obtained through hydrogenolysis.

A further object of the invention is to provide a catalytic process of the conversion of cellulose whereby through the use of various different suspension media, different final products may be obtained.

With these and other objects in view the invention comprises the various features hereinafter more particularly described and defined in the annexed claims.

The invention, in its preferred form, may be described as comprising the following steps:

1. Dissolving cellulose completely in Schweizer's solution.
2. Reducing the viscous cuprate solution of cellulose to form a co-precipitate of cellulose containing metallic copper in a fine state of homogeneous dispersion.
3. Suspending the co-precipitate of cellulose and copper in aqueous methanol and subjecting the same to hydrogenolysis at moderate pressures at a temperature preferably above 240° C.
4. Separating the copper catalyst from the product of the hydrogenolysis, and
5. Separating the product of hydrogenolysis into its various constituents.

It will be understood that the method may be varied to a considerable extent, as will appear from the following examples of the method of carrying out the invention. In carrying out the procedure, however, a co-precipitate of cellulose and copper is first obtained, which may be carried out as follows: 65 grams of cellulose, in the form of filter paper, for example, calculated on a moisture free basis, may be finely comminuted and then dissolved in 820 cc. of Schweizer's solution containing 41 grams of copper.

The comminution of the filter paper may be carried out in any desired manner and may be pulped, for example, with water in an Abbe ball mill by which an initial separation of the fibers of the paper may be obtained. The paper pulp may then be dried to a uniform moisture content.

Prior to the treatment with the Schweizer's reagent, the pulp is preferably soaked with 28% ammonium hydroxide for a period of about six hours, for example, and then filtered by suction to provide a substantially ammoniacal pulp. In the treatment of the cellulose with Schweizer's reagent, it is preferable to maintain the mixture at a temperature between 0.0° and 5.0° C. to prevent side reactions, particularly the formation of nitrites. The cuprate solution of cellulose is then placed in hydrogenation equipment, as a hydrogenation bomb, and hydrogen is then admitted under a pressure of about 500 lbs. per sq. in., for example, and subjected to a temperature between about 140° to 190° C., or at a temperature of 150° C., for example, for a period of about two hours.

By this procedure the cellulose is regenerated and appears as red curds through which metallic copper is intimately and homogeneously dispersed in a finely divided state. The co-precipitate is then freed from ammonium hydroxide and is then washed with water, care being taken that air does not come into contact with the co-precipitate. The co-precipitate, thus freed from ammonium hydroxide, may then be dried completely or to a uniform moisture content, depending upon the requirements of the method in which it is to be used.

*Example I*

A quantity of the co-precipitate of cellulose and copper, obtained in the manner above described and containing 65 grams of cellulose with 41 grams of copper, for example, was suspended in 360 cc. of aqueous methanol solvent (containing 90 cc. of water and 270 cc. of methanol) and hydrogenolyzed with hydrogen under an initial pressure of 1,000 lbs. per sq. in. in a reaction bomb having a free space of 560 cc. The hydrogenolysis continued for a period of five hours at a temperature between 267° C. to 270° C., during which the maximum pressure reached was 2800 lbs. per sq. in. and the final pressure was 490 lbs. per sq. in.

The amount of hydrogen consumed in the process was 2.5 mols of hydrogen per mol of glucose residue theoretically present in the original cellulose. The conversion of the cellulose in this process was complete and the contents of the bomb at the end of the procedure described consisted of a single phase, that is a liquid phase, except for gases and the copper catalyst. The product was a transparent slightly acid solution which darkened in contact with air. The copper catalyst was separated from the solution by filtration and the product was fractionally distilled to recover the suspension medium and to separate the combined products into fractions containing isopropyl alcohol, propylene glycol and acetol.

The liquid fraction obtained as a result of the experiment contained 11% of isopropyl alcohol in an aqueous mixture boiling between 80° C. and 98° C. (mainly 80.4° C.), 5% of an acetol fraction boiling between 66° C. and 69° C. at 50 mm. pressure, 29% of propylene glycol boiling between 187° C. and 190° C., and 14.5% of a fixed gas composed mainly of carbon dioxide but containing an appreciable proportion of methane. The percentages of the various products obtained, above stated, are calculated based on the weight of the products obtained and the weight of the cellulose used.

*Example II*

Another sample of a co-precipitate of cellulose and metallic copper, obtained by the method above described and containing 75 grams of cellulose and 39 grams of copper, was suspended in a mixture containing 250 cc. of tetralin (tetrahydronaphthalene) and 100 cc. of methanol and hydrogenolysed under a pressure of hydrogen of 1,000 lbs. per sq. in. at a temperature between 319° C. and 322° C. for a period of five hours. The maximum pressure reached was 2480 lbs. per sq. in. and the final pressure, after cooling the bomb in which the experiment was carried out, was 720 lbs. per sq. in. There was a free space of 580 cc. in the bomb, and 2.5 mols of hydrogen were consumed for each mol of glucose residue theoretically present in the cellulose used. After cooling the bomb, the contents were removed and separated, including the catalyst, the methanol, which contained most of the hydrogenolysis products of the cellulose, and the tetralin, which contained some methanol and hydrogenolysis products of the cellulose.

After separation of the solid copper catalyst by filtration, the liquid layers of the methanol and tetralin were separated in a separatory funnel and each layer was then subjected to fractional distillation, yielding the following products, the amounts of which are expressed in percentages calculated on the weight of the products and the weight of cellulose used:

1. 15% of isopropyl alcohol in an aqueous mixture boiling between 80° C. and 98° C. (mainly 80.4° C.).
2. 15% of water containing some acetol and boiling between 98° C. and 102° C.
3. 10% of a fraction containing mainly acetol and boiling between 50° C. and 70° C. under a reduced pressure of 50 mm. of mercury.
4. 18% of propylene glycol, boiling between 184° C. and 191° C., and
5. 27% of an undistillable fraction containing other organic products left behind after the recovery of tetralin.

The various fractions obtained may be purified to any desired extent by refractionation and other well known methods adapted for the purpose.

*Example III*

Another sample of a dried co-precipitate of cellulose and metallic copper produced by the method above described and containing 25 grams of cellulose and 10 grams of copper was suspended in 150 cc. of water and subjected to hydrogenolysis under an original pressure of 1000 lbs. per sq. in. for a period of five hours at a temperature of from 262° C. to 267° C. The maximum pressure reached was 1875 lbs. per sq. in. and the final pressure after cooling the bomb in which the experiment was carried out was 700 lbs. per sq. in. The hydrogen consumption during the experiment was 1.90 mols of hydrogen per mol of glucose residue theoretically present in the cellulose treated. After removal of the contents from the bomb, it was found that all of the cellulose originally present was consumed. The products consisted of a water soluble fraction and about 10 grams of a yellowish syrupy and sticky material which was mixed with the catalyst and also condensed on the inner surface of the bomb. The aqueous fraction contained acid corresponding in amount to a conversion of 1.5% of the cellulose into acetic acid. There was a yield of about 7 grams of a hydroxyketone, which was identified as acetol. The 10 grams of the yellowish sticky material was found to be polymerized acetol. In further experiments in which the water was replaced by ammonium hydroxide, with other conditions remaining substantially the same as above stated in Example III, the course of the reaction and the yields were not altered to any appreciable extent.

It is shown from the above examples that if the suspension medium is water or ammonium hydroxide, the hydrogenolysis of the coprecipitate of cellulose and copper at a temperature of about 265° C. and under an initial hydrogen pressure of approximately 1,000 lbs. per sq. in. results in the formation of acetol and a small amount of acetic acid (1.5% of the weight of cellulose), provided, that in the preparation of the co-precipitate, the cellulose is completely dissolved in the Schweizer's solution. On the other hand, if the suspension medium is aqueous methyl alcohol, the final products of the hydrogenolysis of the co-precipitate are isopropyl alcohol, propylene glycol, acetol and some undistillable residue; and further hydrogenation of the intermediate product, acetol, produces isopropyl alcohol and propylene glycol in the presence of the aqueous methyl alcohol.

In general, it may be stated that the most effective catalyst for the hydrogenolysis of cellulose is copper in finely distributed and intimate contact with the cellulose, as is produced by dissolving cellulose in Schweizer's solution and reducing the copper therein to the metallic state to form a co-precipitate of copper and cellulose, in which the catalyst permeates the structure of the cellulose fibres. It will be understood that copper in Schweizer's solution is precipitated as copper hydroxide when heated above 150° C. in a closed system. If cellulose is dissolved in the Schweizer's solution and similarly heated, a simultaneous co-precipitation of homogeneously dispersed copper hydroxide in cellulose is obtained. Hydrogenation of this co-precipitate between 150° C. and 190° C. results in the reduction of the copper hydroxide to metallic copper which remains distributed in finely dispersed particles throughout the body of the precipitated cellulose.

It is to be understood that I do not wish to be bound by any theory of reaction or interaction produced in the method above described for the production of isopropyl alcohol, propylene glycol and acetol. It may be stated as a matter of theory, however, that the probable reactions which are involved in the hydrogenolysis of cellulose containing intimately admixed catalyst under the conditions above described are as follows:

1. Cellulose decomposes at about 260° C. to form methyl glyoxal.
2. Methyl glyoxal is hydrogenized at about 260° C. to form acetol.
3. Acetol is hydrogenized in the presence of aqueous methanol to form propylene glycol. (The use of aqueous methanol as a suspension medium avoids substantial transformation of acetol into a high polymer and permits the formation of propylene glycol and isopropyl alcohol as products of the process.)
4. Propylene glycol is hydrogenized under the pressures and temperatures above described to form isopropyl alcohol.

It is to be understood also that I do not wish to be limited to the specific catalyzer above described or to the specific method of introducing and distributing the catalyzer through the body of the cellulose to be treated, although the method specifically described has been found to produce the best results, completely transforming the cellulose into liquid and gaseous products without the production of a solid residue. It will be understood also that various changes or modifications may be made in the various details and steps of the procedure above described without departing from the spirit or scope of the invention as defined in the annexed claims.

Having thus described the invention, what is claimed as new is:

1. A method for the preparation of alcohols, glycols and hydroxyketones from cellulose which comprises dissolving cellulose in Schweizer's reagent, subjecting the resulting cellulose solution to hydrogenation at a temperature between about 140° C. and 190° C. and under substantial pressure for a period of about two hours to form a co-precipitate of cellulose and metallic copper, in which the copper is uniformly dispersed through the body of the cellulose, subjecting the said co-precipitate to hydrogenolysis for a period of hours under a pressure of at least 700 pounds per square inch in the presence of water and hydrogen and at a temperature between about 240° C. and 322° C. to convert the cellulose into liquid and gaseous products containing substantial yields of alcohols, glycols and hydroxyketones and separating the conversion products.

2. A method for the preparation of isopropyl alcohol, propylene glycol and acetol from cellulose which comprises dissolving cellulose in Schweizer's reagent, subjecting the resulting cellulose solution to hydrogenation at a temperature between about 140° C. and 190° C. and under pressure for about two hours to form a co-precipitate of metallic copper and cellulose in which the copper is in the form of a dispersion in fine state distributed throughout the body of the cellulose, washing the co-precipitate, subjecting the said co-precipitate to hydrogenolysis under a pressure in excess of 700 pounds per square inch and at a temperature of from about 240° C. to 270° C. in the presence of water and hydrogen for a period of about five hours to convert the cellulose into liquid and gaseous products including alcohols, glycols and hydroxyketones without the formation of tar and separating the alcohols, glycols and hydroxyketones from other reaction products.

3. A method for the preparation of isopropyl alcohol and propylene glycol from cellulose which comprises dissolving cellulose in Schweizer's reagent, subjecting the resulting cellulose solution to hydrogenation at a temperature between about 140° C. and 190° C. and under substantial pressure for a period of about two hours to form a co-precipitate of cellulose and metallic copper in which the copper is uniformly dispersed throughout the body of the cellulose, suspending the said co-precipitate in an aqueous suspension medium adapted to permit the formation of isopropyl alcohol and propylene glycol from the cellulose, subjecting the resulting suspension to hydrogenolysis at a temperature between about 250° C. and 270° C. in the presence of hydrogen in excess of the amount required for reaction and under substantial pressure for a period of hours sufficient to convert the cellulose into liquid and gaseous reaction products containing substantial proportions of isopropyl alcohol and propylene glycol and separating the isopropyl alcohol and propylene glycol from the said reaction products.

4. A method for the preparation of acetol from cellulose which comprises dissolving cellulose in Schweizer's reagent, subjecting the resulting cellulose solution to hydrogenation at a temperature between about 140° C. to 190° C. and under substantial pressure for a period of about two hours to form a co-precipitate of cellulose and metallic copper in which the copper is uniformly distributed throughout the body of the cellulose, suspending the co-precipitate in a suspension medium containing water, subjecting the resulting suspension to hydrogenolysis at a temperature between about 250° C. and 270° C. in the presence of hydrogen under a high initial pressure of about 1000 pounds per square inch and continuing the hydrogenolysis for a period of about five hours, and subjecting the resulting reaction product to fractional distillation to separate acetol from the remaining reaction product.

5. A method for the preparation of liquid organic products from cellulose which comprises dissolving the cellulose to be treated in Schweizer's reagent, at a temperature between 0 to 5° C., subjecting the resulting solution to the action of hydrogen under pressure at a temperature of about 150° C. for a period of time sufficient to reduce the copper and to form a co-precipitate of cellulose and copper in which the metallic particles of copper are intimately and homogeneously dispersed in a finely divided state, subjecting a suspension of the co-precipitate in aqueous methyl alcohol to hydrogenolysis at a temperature between 250° C. and 270° C. in the presence of hydrogen under substantial pressure for a time sufficient to substantially complete the hydrogenolysis by which liquid organic products are produced together with a proportion of fixed gases, separating the copper from the products of the reaction and separating the liquid organic products from the said gases.

6. A method for the preparation of acetol in accordance with claim 4 in which the suspension medium containing water is aqueous methyl alcohol.

7. The process of producing a co-precipitate of cellulose and copper which comprises dissolving cellulose in Schweizer's reagent, reducing the resulting solution with hydrogen under pressure at a temperature from about 140° C. to 190° C. for about two hours by which a co-precipitate of cellulose and metallic copper in the form of a dispersion in fine state distributed throughout the cellulose is formed and washing the co-precipitate out of contact with air.

8. The process of producing a co-precipitate of cellulose and a catalyst, which comprises dissolving cellulose in Schweizer's solution and then treating the same with hydrogen under pressure of about 500 pounds per square inch and at a temperature of about 150° C. to cause a precipitation of copper in the form of a dispersion in fine state distributed throughout the cellulose.

HAMIT H. GÜRKAN.

REFERENCES CITED

The following references are of record in the file of this patent:

UNITED STATES PATENTS

| Number | Name | Date |
|---|---|---|
| 1,915,431 | Lautenschlager et al. | June 27, 1933 |
| 2,022,589 | Doby | Nov. 26, 1935 |
| 2,087,609 | Richter | July 20, 1937 |
| 2,325,206 | Stengel | July 27, 1943 |
| 2,417,869 | Goldthwait et al. | Mar. 25, 1947 |

OTHER REFERENCES

Bowen et al.: J. Soc. Chem. Ind., vol. 44, pages 507T–511T, 626T (1925).

Fierz-David: Chemistry and Industry, vol. 44, pages 942–944 (1925).